(12) United States Patent
Woodhouse et al.

(10) Patent No.: US 7,866,560 B2
(45) Date of Patent: *Jan. 11, 2011

(54) RECOVERING COMMUNICATION TRANSACTION CONTROL BETWEEN INDEPENDENT DOMAINS OF AN INTEGRATED CIRCUIT

(75) Inventors: Sheldon James Woodhouse, Cambridge (GB); Richard Roy Grisenthwaite, Nr Royston (GB); Daryl Wayne Bradley, Willingham (GB); Edmond John Simon Ashfield, Cambridge (GB)

(73) Assignee: ARM Limited, Cambridge (GB)

( * ) Notice: Subject to any disclaimer, the term of this patent is extended or adjusted under 35 U.S.C. 154(b) by 1043 days.

This patent is subject to a terminal disclaimer.

(21) Appl. No.: 11/649,370

(22) Filed: Jan. 4, 2007

(65) Prior Publication Data

US 2007/0170269 A1    Jul. 26, 2007

Related U.S. Application Data (63) Continuation-in-part of application No. 11/045,580, filed on Jan. 31, 2005, now Pat. No. 7,165,729.

(30) Foreign Application Priority Data

Sep. 8, 2004    (GB) ................................ 0419932.9

(51) Int. Cl.
*G06K 19/06*    (2006.01)
(52) U.S. Cl. ...................... 235/492; 235/376
(58) Field of Classification Search ................. 235/376, 235/474, 476, 487, 492
See application file for complete search history.

(56) References Cited

U.S. PATENT DOCUMENTS

| | | | | |
|---|---|---|---|---|
| 5,406,064 A | * | 4/1995 | Takahashi | .................. 235/492 |
| 5,420,412 A | * | 5/1995 | Kowalski | .................. 235/492 |
| 6,009,477 A | | 12/1999 | Sarangdhar et al. | |
| 6,122,690 A | | 9/2000 | Nannetti et al. | |
| 6,454,172 B1 | * | 9/2002 | Maeda et al. | ................ 235/492 |
| 6,601,771 B2 | * | 8/2003 | Charrin | .................... 235/492 |
| 7,165,729 B2 | * | 1/2007 | Bradley et al. | .............. 235/492 |
| 2004/0193836 A1 | | 9/2004 | Ramanadin | |

FOREIGN PATENT DOCUMENTS

| | | |
|---|---|---|
| JP | 5-11938 | 1/1993 |
| JP | 6-274286 | 9/1994 |
| JP | 10-207649 | 8/1998 |

OTHER PUBLICATIONS

List of cited references and Japanese Office Action dated Jan. 5, 2010 in corresponding JP application.

* cited by examiner

*Primary Examiner*—Daniel St. Cyr
(74) *Attorney, Agent, or Firm*—Nixon & Vanderhye P.C.

(57) ABSTRACT

Within an integrated circuit (2) independently controllable domains (4, 6, 8, 10, 5 12, 14) may be unable to complete pending transactions taking place between domains. Each domain is provided with a state machine (20, 22) which is responsive to the state of the state machine within the other domain and when this indicates that the other domain is not communicating triggers modified behavior. This can provide that the predetermined transaction protocol is not broken and/or complete a partially completed transaction when the domain concerned has recovered from an error or other event which disrupted the communication.

37 Claims, 6 Drawing Sheets

| A Encoding | | B Encoding | |
|---|---|---|---|
| A Initialise | 0001 | B Initialise | 001 |
| A Ready | 0010 | B Ready | 010 |
| A Busy | 0100 | B Busy | 100 |
| A Hold | 1000 | | |

RECOVERING COMMUNICATION TRANSACTION CONTROL BETWEEN INDEPENDENT DOMAINS OF AN INTEGRATED CIRCUIT

This application is a Continuation-In-Part of U.S. application Ser. No. 11/045,580 filed 31 Jan. 2005 now U.S. Pat. No. 7,165,729 claims priority to GB Application No. 0419932.9 filed 8 Sep. 2004, the entire contents of which are incorporated herein by reference.

BACKGROUND OF THE INVENTION

1. Field of the Invention

This invention relates to the field of integrated circuits. More particularly, this invention relates to a communication transaction control between independently controllable circuit domains within an integrated circuit.

2. Description of the Prior Art

As integrated circuits have increased in complexity, it has become more common to divide such circuits into multiple independently controllable domains. These domains can be independently controllable in the sense that they may be subject to independent power control, independent clocking (asynchronous and/or different speeds), independent resets, independent error recovery (e.g. from speculative processing errors (e.g. see the type of speculative processing described in WO-A-2004/084072, the content of which is incorporated herein in its entirety by reference) or errors due to particle strikes, etc.) or combinations of the above or other control parameters. The separate domains may, for example, contain circuit elements such as a DSP circuit, a general purpose CPU, peripheral interface circuits and the like, which can be selectively powered down when not in use, subject to different clocking speeds, subject to independent reset signals depending upon the circumstances or subject to independent error recovery mechanisms. Whilst such different domains are subject to this independent control, they are also required to communicate with each other via communication transactions and in accordance with predetermined transaction protocols. It is advantageous if the different circuit elements standardise their transaction protocol so as to facilitate design reuse and interoperability. An example of such transaction protocols are the AMBA transaction protocols originated by ARM Limited, Cambridge, England, such as the AHB protocol. Such transaction protocols typically require a predetermined sequence of signals to be generated and responses received by each party until the transaction completes. If one or more of these signals is in someway lost, then the transaction protocol is not complied with and an erroneous operation can occur, e.g. in a severe case an entire communication bus may be locked up due to an incomplete transaction.

One approach to dealing with this problem is to seek to ensure that each circuit taking part in the transaction fully completes every transaction which it has started before being disrupted by any other influence. As an example, a circuit element may defer being powered down or reset until it has completed all of its pending transactions. However, this requirement can introduce significant disadvantageous complexity and/or other performance problems, such as inadvertently delaying a required reset for an indeterminate period of time.

Another problem arises in systems in which different domains are subject to independent error recovery, with errors occurring relatively frequently as part of their expected behaviour. Non-permanent, or soft errors, for example, due to particle strikes, are becoming more frequent. In a desire to run at higher speeds and lower voltages, timing margins are being reduced such that timing errors become relatively frequent. These frequent errors can be handled by building in appropriate recovery mechanisms for the domains in which the errors have occurred. Stopping the propagation of these errors beyond the domain in which they occur and reducing the time lost in recovering from these errors are both desirable aims.

SUMMARY OF THE INVENTION

Viewed from one aspect the present invention provides an integrated circuit comprising:

a first domain including a first communication circuit;

a second domain including a second communication circuit coupled to said first communication circuit;

a first state machine having states indicative of a communication status of said first communication circuit; and a second state machine having states indicative of a communication status of said second communication circuit; wherein said first domain and said second domain are separately controllable such that at least said second communication circuit may independently move to a state in which it does not communicate with at least said first communication circuit; and movement between states of said first state machine is at least partly controlled by a current state of said second state machine such that if said second communication circuit changes to a state in which communication is in error part way through a pending communication transaction between said first communication circuit and said second communication circuit, then said first state machine makes an associated move between states and said first communication circuit processes said pending communication transaction in accordance with a modified behaviour.

The present technique provides state machines for the respective circuits on each side of a communication transaction interface with those state machines being responsive to the communication status of the other circuit in the way in which they move between states. These state machines operate to monitor the other party to the transaction and to enable transaction completion through modified behaviour (this may be a fixed modified behaviour or a varying modified behaviour, which varies, for example, in dependence upon the point reached in the transaction when the error occurred and/or the nature/cause of the error) after the other party to that transaction fails to communicate. In this way, in at least some embodiments, independent control of the different domains can be preserved without undue constraint and yet well defined completed behaviour for pending transactions can be ensured. In some embodiments, the propagation of errors outside of the domain in which they occur may be halted at the transaction boundary by exploiting the latency inherent in the communication transaction whilst the performance impact can be reduced by completing the partially performed transactions when possible rather than starting the transactions over from scratch.

In some integrated circuit embodiments it may be that only one party to the transaction is likely to become non-responsive. However, in a preferred system the behaviour is more symmetric with either party being able to deal with the other party becoming non-responsive, or otherwise not able to communicate.

As previously mentioned, the different domains may be independently controllable in a wide variety of ways, which may make them non-communicative. Particularly common circumstances with which it is desired to deal are ones arising from independent resets, independent power downs and independent clocking.

The predetermined modified behaviour can take a wide variety of different forms to cover various circumstances such as recovery from error, power-down, reset or other interruption in a pending transaction. Particularly preferred forms are returning a transaction error response, returning no response and/or returning a predetermined modified response. Depending upon the nature of the transaction concerned across the transaction interface in question, different ones of these modified behaviours may be used.

In many common transaction scenarios one circuit will be a transaction master circuit and one circuit will be a transaction slave circuit with respect to passing the pending communication transaction across the transaction interface. In this context, a transaction master circuit serving as the first communication circuit and including the first state machine is provided with a holding state into which it moves in response to the second state machine moving into a state indicative of either the second communication circuit being in a busy state or being unable to communicate, and from which holding state a move is made in response to the second state machine moving to a state indicative of either the second communication circuit being ready to receive a further communication transaction or being unable to communicate.

The first state machine serving as a transaction master within preferred embodiments moves from a ready state to a busy state when the second communication circuit is in a ready state and a communication transaction is initiated.

In embodiments in which the second communication circuit is a transaction slave, said second state machine preferably moves from a ready state to a busy state when the first state machine moves to a busy state.

Following on from this, the second state machine preferably moves from a busy state to a ready state when the first state machine is in the holding state or is unable to communicate and processing of a pending transaction has been completed by the second communication circuit.

In order to increase the robustness of the communication between the first state machine and the second state machine this communication uses hot one encoded signals to pass respective state information therebetween with signals not conforming to one hot encoding being ignored.

The present technique is particularly useful in embodiments in which one of the domains is a debug circuit domain. Debug circuit domains often have a requirement to be independently controlled relative to the integrated circuit as a whole and can be disruptive if transactions involving the debug circuit are allowed to interfere with the normal operations of the circuit that are non-debug related.

It will be appreciated that the first state machine and the second state machine could either or both be part of larger state machines controlling the overall communication of their respective circuits.

The first domain and the second domain may be differentiated in that they are subject to separate error recovery. The error can arise in a variety of different ways, such as timing errors, single event upset errors (particle strikes), permanent hardware failures requiring alternative hardware to be switched into use, etc.

The modified behaviour triggered upon error recovery, or recovery from a reset or power down, can take many different forms. One example is to restart a stalled transactions from a point at or close to the point reached in that transaction when the error occurred. Another example which is particularly useful when the error occurs in the transaction master is to have a partially completely write from the transaction master completed in the form of a read initiated from the previous transaction slave now acting as a transaction master and corresponding to at least the portion of the write which did not complete.

The state machines used to control completion of transactions following error recovery can be formed to have an additional recovery state into which they move whilst any necessary recovery takes place with the partial state of the transaction being preserved such that, upon recovery being completed, the transaction can similarly be completed.

Viewed from a further aspect the invention provides an integrated circuit comprising:

a first domain including a first communication means;

a second domain including a second communication means coupled to said first communication means;

a first state machine means for moving between states indicative of a communication status of said first communication means; and a second state machine means for moving between states indicative of a communication status of said second communication means; wherein said first domain and said second domain are separately controllable such that at least said second communication means may independently move to a state in which it does not communicate with at least said first communication means; and movement between states of said first state machine means is at least partly controlled by a current state of said second state machine means such that if said second communication means changes to a state in which communication is in error part way through a pending communication transaction between said first communication means and said second communication means, then said first state machine means makes an associated move between states and said first communication means processes said pending communication transaction in accordance with a modified behaviour.

Viewed from a further aspect the invention provides a method of operating an integrated circuit having a first domain including a first communication circuit and a second domain including a second communication circuit coupled to said first communication circuit, said method comprising the steps of:

communicating between said first communication circuit and said second communication circuit with communication transactions;

moving a first state machine between states indicative of a communication status of said first communication circuit; and moving a second state machine between states indicative of a communication status of said second communication circuit; wherein said first domain and said second domain are separately controllable such that at least said second communication circuit may independently move to a state in which it does not communicate with at least said first communication circuit; and movement between states of said first state machine is at least partly controlled by a current state of said second state machine such that if said second communication circuit changes to a state in which communication is in error part way through a pending communication transaction between said first communication circuit and said second communication circuit, then said first state machine makes an associated move between states and said first communication circuit processes said pending communication transaction in accordance with a modified behaviour.

The above, and other objects, features and advantages of this invention will be apparent from the following detailed description of illustrative embodiments which is to be read in connection with the accompanying drawings.

DESCRIPTION OF PREFERRED EMBODIMENTS

Figure 1:
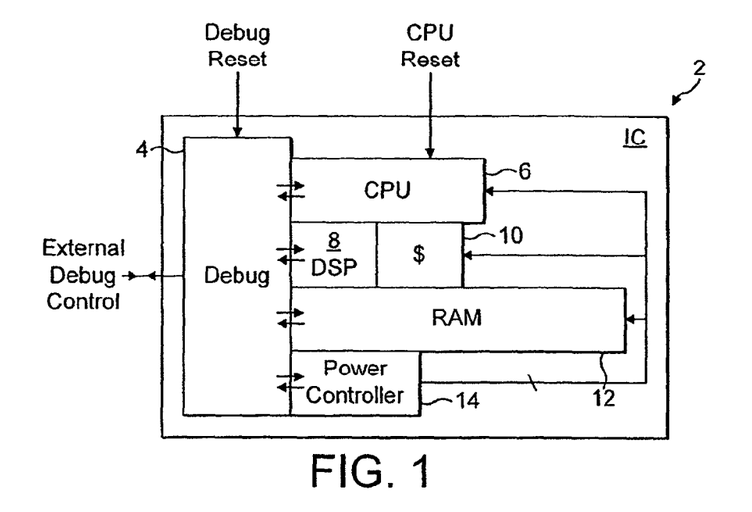
FIG. 1 schematically illustrates an integrated circuit including multiple circuit domains.

FIG. 1 schematically illustrates an integrated circuit 2 comprising multiple circuit domains including a debug circuit 4, a CPU 6, a DSP 8, a cache memory 10, a random access memory 12 and a power controller 14. These different circuit elements in their respective domains are subject to independent control, e.g. the debug domain 4 and the CPU 6 have respective independent reset signals as illustrated. The power controller 14 also operates to independently power-up or power-down the different circuit domains 6, 8, 10, 12 as well as to vary the clocking speeds to these different domains, including stopping the clocks completely. Resets may also be controlled from 14.

As illustrated by the bi-directional arrows in FIG. 1, the debug circuit 4 communicates with various of the other circuit elements in their respective domains via communication transactions which conform to a fixed transaction protocol, e.g. an AHB protocol. The bus infrastructure via which these transaction communications take place for the debug circuit 4 is shared with the normal operation of communication infrastructure and accordingly it is important that problems with uncompleted transactions involving the debug circuit 4 do not interfere with this infrastructure in a way that would upset normal operation.

Figure 2:
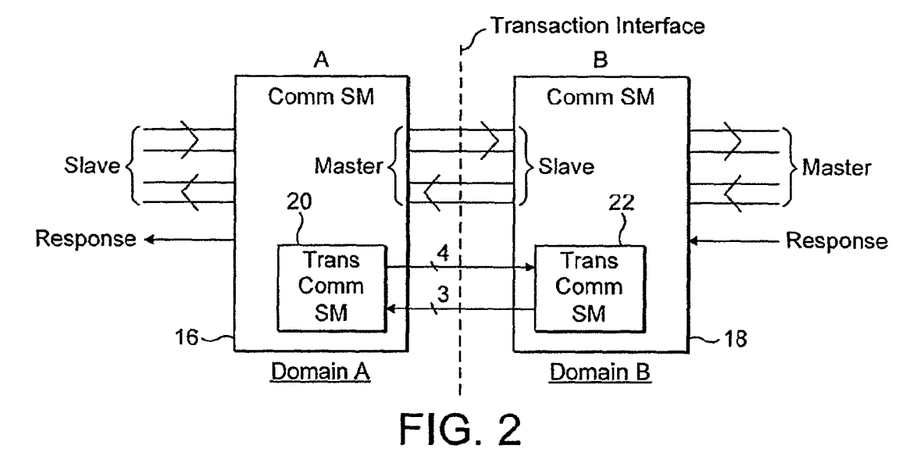
FIG. 2 schematically illustrates communication state machines for controlling transfer of a communication transaction between circuit domains.

FIG. 2 schematically illustrates communication controlling state machines 16, 18 for controlling a communication transaction passing between a first domain A and a second domain B. This transaction can use a variety of transaction protocols. Such transaction protocols typically require a predetermined sequence of signals to be exchanged in either direction, e.g. including address, data, response, error and other signals. As well as controlling in the transactions to be communicated in accordance with these predetermined protocols, the state machines 16, 18 also include transaction level state machines 20, 22 which serve to monitor the other parties ability to continue to communicate and to complete pending transactions. One hot encoded status signals are exchanged between these transaction level state machines 20, 22 so that they can respond to each other's state and control their own respective higher level state machines 16, 18 to respond appropriately to the other party not being able to complete a pending transaction. Examples of appropriate modified behaviour when the other party is unable to complete the transaction include returning an error response, returning no response or returning a predetermined modified response. Depending upon the nature of the transaction being conducted, or the circuit concerned, any of these options may be triggered, or alternatively different modified behaviours may be used.

Figure 3:
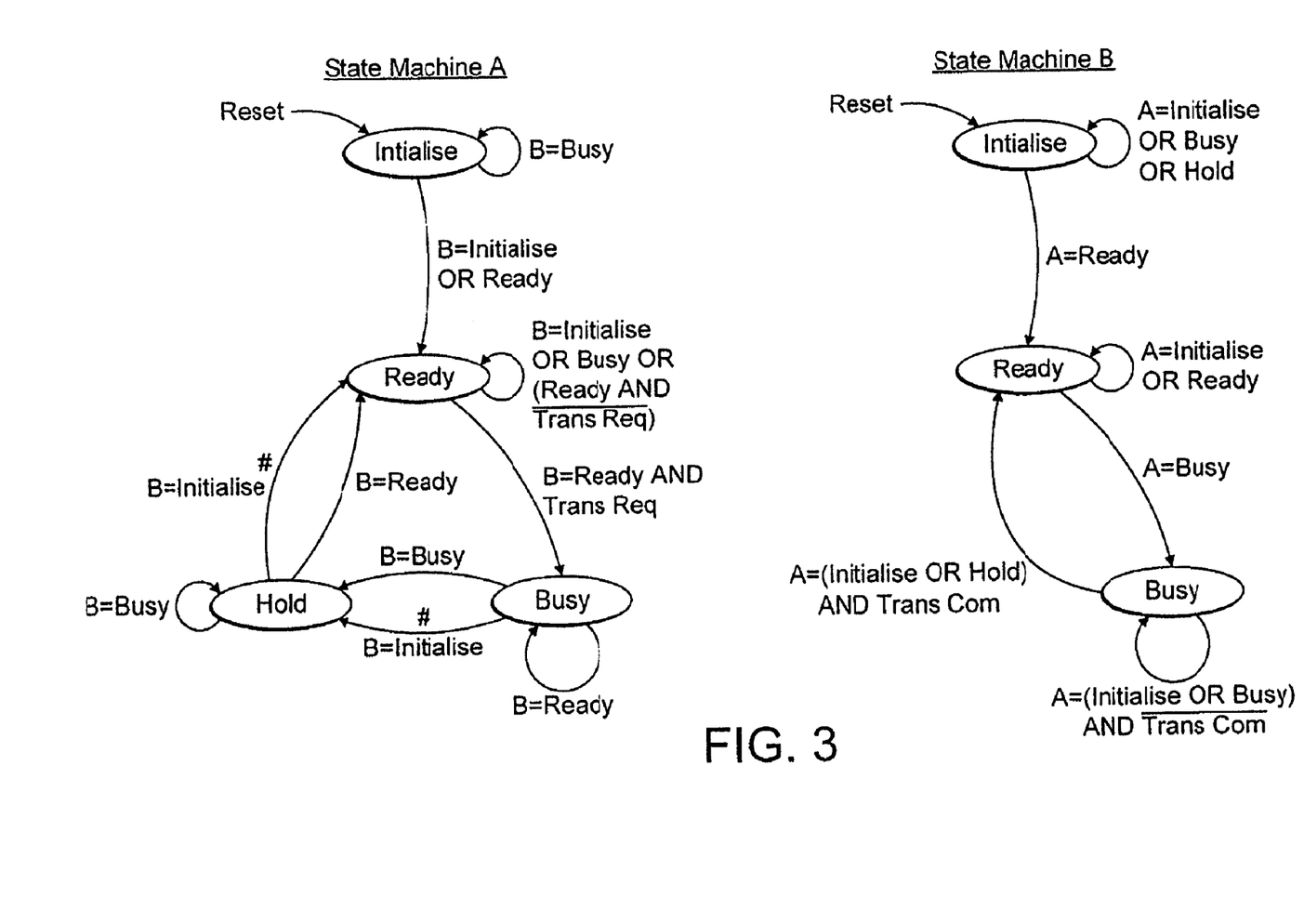
FIG. 3 schematically illustrates different communication status states which are adopted by transaction level state machines within the circuits of FIG. 2.

FIG. 3 schematically illustrates the different states adopted by the transaction level state machines 20, 22, 23 of FIG. 2 in this example embodiment. The state machine for domain A in the context of communication transactions passing across the transaction interface of FIG. 2 can be considered to be the master which initiates the transaction. As will be seen, both of the state machines 20, 22 reset into an initialised state. For domain A, the state machine 20 remains in this state until the state machine 22 for the domain B is either initialised or enters its ready state. The state machine 22 for domain B remains in the initialised state until the state machine 20 for domain A enters its ready state.

The state machine 20 for domain A moves from its ready state to its busy state when it is detected that the state machine 22 for domain B is in its ready state and a transaction request is initiated within domain A to be passed to domain B across the transaction interface in question as illustrated in FIG. 2. The state machine 20 for domain A will then remain in this busy state until either the state machine 22 for domain B enters its busy state or its initialised state, at which time the state machine 20 for domain A passes to its hold state. If the move to the hold state is as a consequence of the state machine 22 for domain B moving to the initialised state, then this indicates that domain B will not be able to complete the pending transaction and accordingly a modified response is triggered (as indicated by the "#" in the drawing). These modified behaviours are as previously discussed.

Domain A will remain with its state machine 20 in the hold state whilst domain B is busy until domain B either moves to the ready state or is initialised. If initialisation of domain B occurs, then again this indicates non-completion of the pending transaction and modified behaviour is triggered.

The behaviour of state machine 22 for domain B is slightly different/simpler. Having passed through its initialised state, the state machine 22 for domain B remains in the ready state until the state machine 20 for domain A becomes busy. At this time the state machine 22 for domain B moves to the busy state and remains there until the state machine 20 for domain A is in either its initialised state or its holding state and the pending transaction has been detected as being completed. The state machine 22 for domain B then returns to the ready state. This behaviour of remaining in the busy state and waiting until the transaction completes irrespective of whether the state machine 20 for domain A indicates that domain A has been initialised allows domain B to complete its intended transaction behaviour irrespective of the fact that domain A is now not able to complete its part of the transaction.

Figure 4:
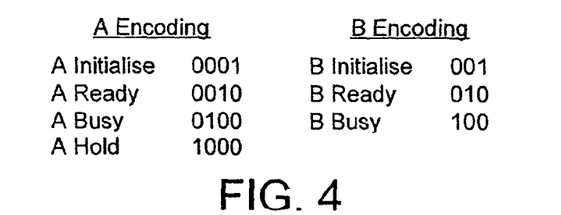
FIG. 4 illustrates an example of one hot encoding which may be used to pass state signals between transaction level state machines.

FIG. 4 schematically illustrates one example of one hot encoding which may be used to communicate the transaction level state machine states between the transaction level state machines 20, 22 shown in FIG. 2. It will be appreciated that other one hot encodings and other forms of encodings may be used. If more than two bits are "1" at any different time, then such signals are ignored as they do not correspond to valid states and are not used to move the transaction level state machines 20, 22 between states.

Figure 5:
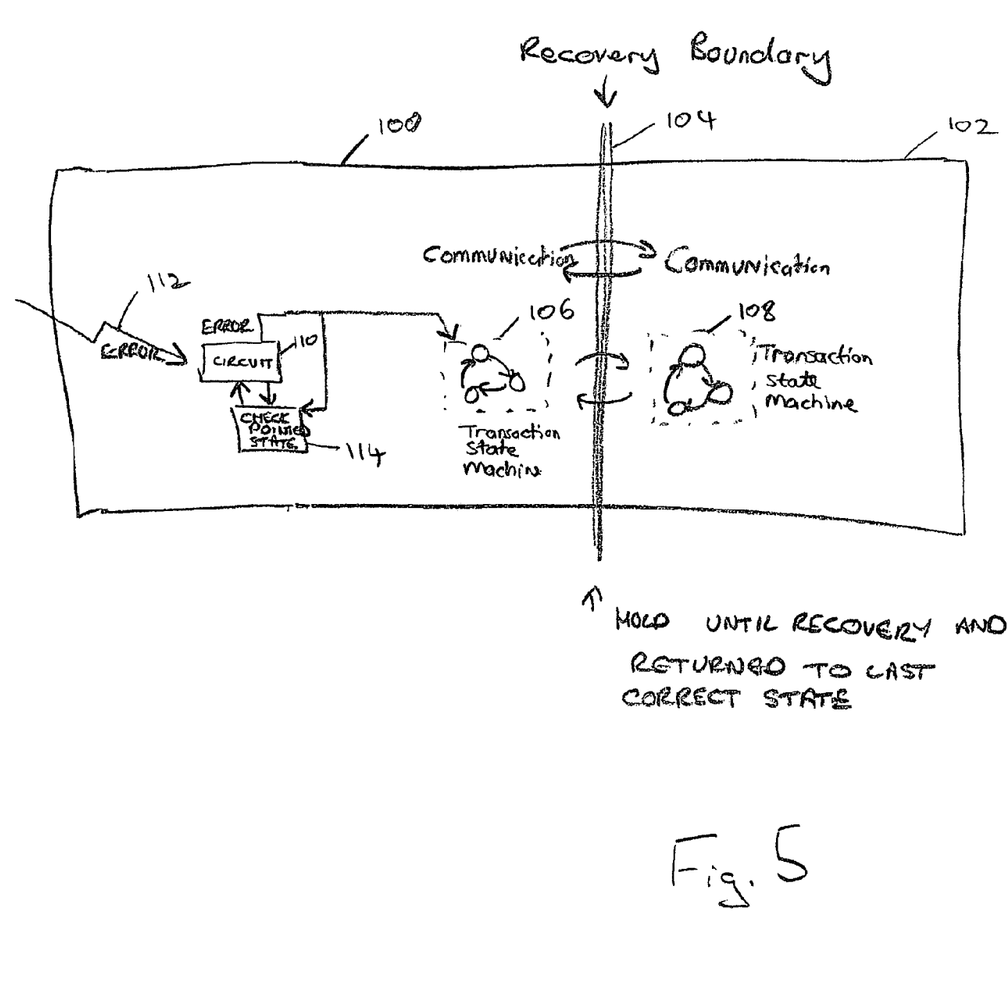
FIG. 5 illustrates two circuit domains which communicate across a boundary with one of those circuit domains having a soft error recovery mechanism.

FIG. 5 illustrates a first domain 100 communicating with a second domain 102 across a recovery boundary 104. The recovery boundary 104 represents an interface through which communication takes place and which separates domains subject to separate recovery from error, e.g. the first domain 100 can detect and recover from an error which results in it not being able to continue communication for a period of time whilst the second domain 102 is not subject to that error and yet follows a behaviour which allows communication to be continued once the first domain 100 has completed its recovery. Illustrated in FIG. 5 are transaction state machines 106 and 108 which respectively track and control the communication status of their respective circuit domains 100, 102 whilst being responsive to signals from the other circuit domain 102, 100 controlling at least some movements between the states of the state machines. Such transaction state machines 106, 108 associated with communications between domains can take a variety of different forms and are modified in accordance with at least some examples of the present techniques to enable communication of a partially completed transaction to be continued when one party to that transaction has been subject to an error and subsequent recovery. As illustrated in FIG. 5, the first domain 100 includes a processing circuit 110 which may be subject to an error, such as a soft error resulting from a particle strike 112. This error can be detected by conventional error checking mechanisms. This error checking mechanisms may, for example, rely upon ECC, parity or other checking techniques. When an error is detected, the first domain 100 initiates a recovery procedure returning to a known check-pointed state as stored within check-point state store 114. The return to a check-pointed known valid state rather than a complete reset of the system to an initialisation state is advantageous in many circumstances e.g. avoiding excessive processing delay associated with error recovery.

The transaction state machines 106 and 108 are responsive to the error detection and recovery behaviour within the first domain 100 to move between states which serve to hold a pending communication taking place between the first domain 100 and the second domain 102 until the first domain 100 has completed its recovery operations (e.g. returned to the last known good state), at which time the communication can be recommenced. The continuation of communication can take the form of continuing from the last known good transfer of data or may repeat one or more preceding assumed good transfers for the sake of additional data security. The communication between the first domain 100 and the second domain 102 might typically include burst mode transfers in which a sequence of data values are transferred. If this transfer is interrupted partway through, then it may be restarted, including resending the data value in transit at the point the error was detected, and thereby reduce the delay associated with error recovery that would result from repeating the communication from the start. In some systems error occurrence and recovery may be frequent and the advantages associated with restarting "paused" communications rather than reinitiating them from the beginning can be considerable. As an example, in systems such as that described in WO-A-2004/084072, it is known to deliberately operate the system with a finite non-zero error rate so as to increase operating speed and reduce energy consumption. In such circumstances, errors will be relatively frequent and avoiding additional communication overhead due to having to repeat from the beginning pending communications is a significant advantage.

Figure 6:
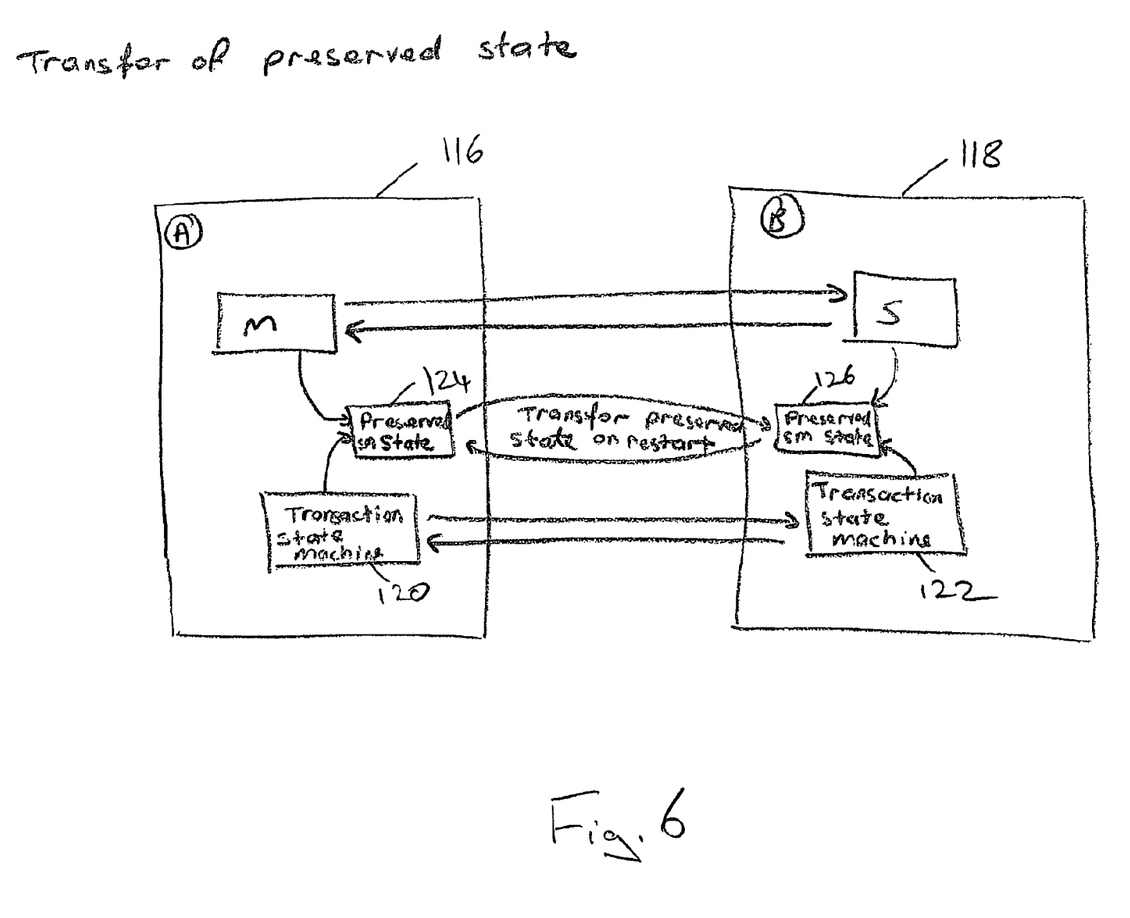
FIG. 6 illustrates two domains communicating across a boundary with transfer of preserved state across that boundary when one of the domains is restarted.

FIG. 6 illustrates a second example embodiment. In this example embodiment the first domain 116 is the transaction master and the second domain 118 is the transaction slave. The error may occur in either the first domain 116 or the second domain 118. In addition to the transaction state machines 120, 122, which track the status of the communication and allow a communication to be held and restarted, the first domain 116 and the second domain 118 additionally include preserved state data stores 124 and 126. When their respective domains are subject to error recovery, which may include a complete reset, then these state stores 124 and 126 are used after the reset to receive from the other domain, which has not been subject to a reset, a stored copy of the state which was transferred out to that other domain when the error was detected such that a pending communication can be restarted and optionally other state within the respective domain 116, 118 restored.

Figure 7:
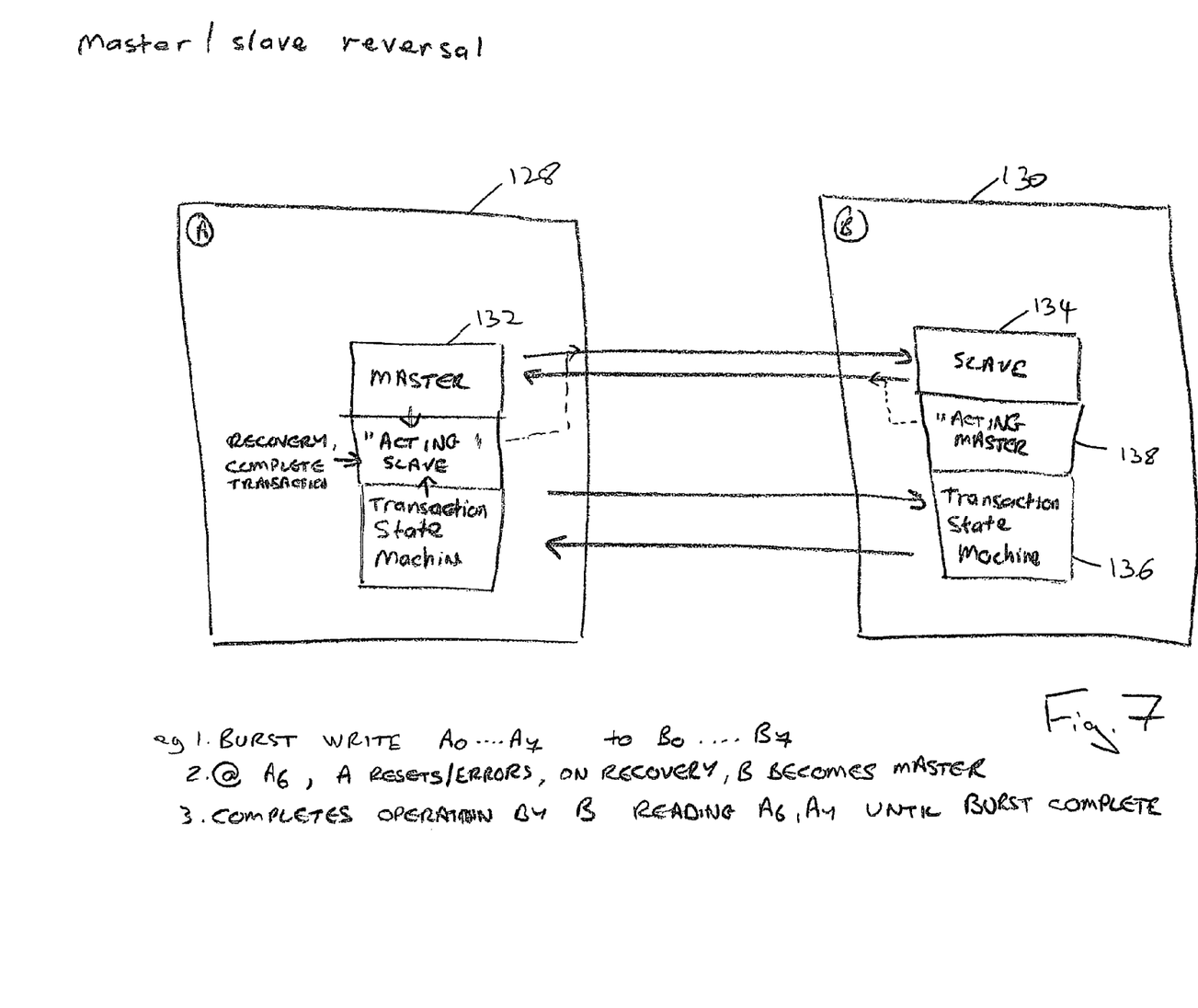
FIG. 7 illustrates two domains communicating across a boundary with master/slave reversal when recovery occurs partway through a burst transfer.

FIG. 7 illustrates a further example embodiment comprising a first domain 128 and a second domain 130. In normal operation the first domain 128 is the master in relation to communication with the second domain 130, as is reflected by the master circuitry 132 and the slave circuitry 134 within these respective domains 128, 130. When the first domain 128 is subject to an error and recovery operation, it may be partway through a burst mode transfer. Rather than repeat the burst mode transfer from the beginning, the technique illustrated in FIG. 7 allows the second domain 130 which is normally the slave, to temporarily act as the transaction master and initiate the completion of the partially completed transaction, with the first domain 128 in this case acting as a slave for this completion of the pending transaction. In the specific example illustrated, a burst mode write from the first domain 128 to the second domain 130 is unable to complete after the first six data values have been sent with two data values remaining unsent. The first domain 128 is subject to a recovery operation in which it looses all of its state and thus is effectively unaware of not having completed the last two items of data transfer. Nevertheless, the second domain 130 through its transaction state machine 136 and its capability to temporarily act as master circuitry 138, is aware that the pending transaction was not able to complete its last two data word transfers and accordingly the second circuit 130, when the first circuit 128 has recovered, temporarily acts as a master device and initiates a transfer of those last two data values. It will be appreciated that the initial data transfer from the first circuit 128 may have been a write to the second circuit 130. However, after the recovery, the second circuit 130 will instead initiate a two word read from the first circuit 128. Another example of use of the present technique is when one domain is subject to a power down or reset resulting in a communication error for any part completed transaction. The modified response can be to wait/pend/stall a transaction until the reset/power-down/errored side is returned to a running operational condition in which it can continue communication.

Figure 8:
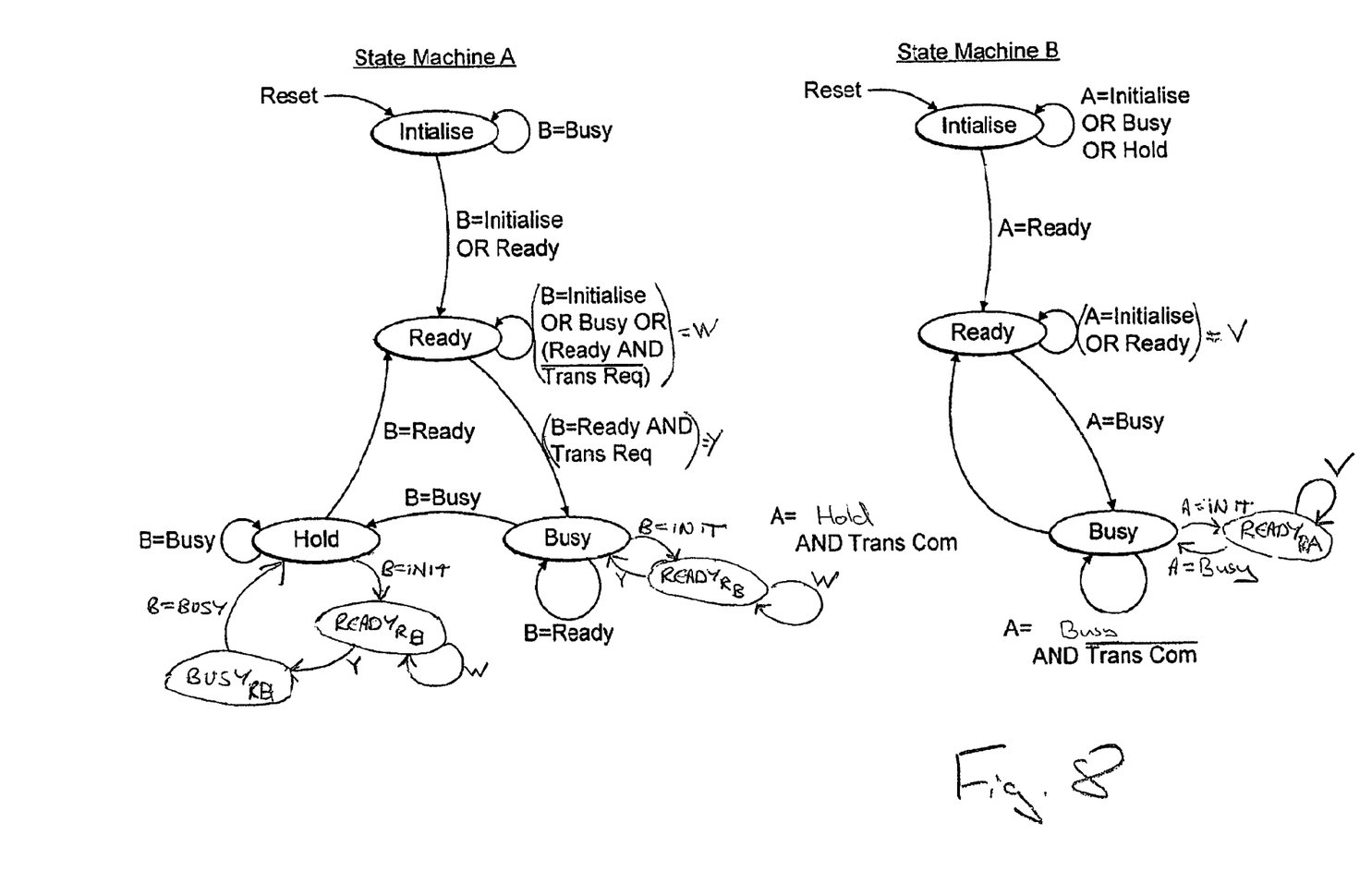
FIG. 8 illustrates different communication status states which are adopted by transaction level state machines which are subject to recovery and restarting of transfers upon occurrence of and recovery from an error.

FIG. 8 schematically illustrates various communication status states which are adopted by the transaction level state machines illustrated in FIGS. 5, 6 and 7 when transactions are interrupted for recovery operations to take place and then be restarted. Compared with the states illustrated in FIG. 3, the state machines of FIG. 8 have additional states into which the state machines pass when recovery of the other state machine is taking place. When the recovery of the other state machine has taken place, then the state machine concerned moves back to the state it had before that error occurred and the transaction can then be completed. It will be appreciated that the states illustrated in FIG. 8 are only one example of the possible states which the transaction state machines may have in order to provide the present techniques and other collections of state will be possible.

Considering the modifications to the states of state machine A shown in FIG. 8, these relate to the behaviour which is triggered when state machine B is subject to initialisation (e.g. error recovery) whilst the state machine A is in either the busy or the hold state. Instead of abandoning the pending communication, the state machine A adds additional states mirroring the ready and busy states which are already provided by state machine A, but in this case specific to the state machine B being subject to a recovery operation at that time. These additional states are donated by a "$_{RB}$" which indicates that they correspond to a recovery taking place at that time within the domain associated with the state machine B. The converse is true within state machine B in relation to the Ready state associated with recovery at that time taking place within the domain associated with state machine A.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
a first domain including a first communication circuit;
a second domain including a second communication circuit coupled to said first communication circuit;
a first state machine having states indicative of a communication status of said first communication circuit; and
a second state machine having states indicative of a communication status of said second communication circuit; wherein
said first domain and said second domain are separately controllable such that at least said second communication circuit may independently move to a state in which said second communication circuit does not communicate with at least said first communication circuit; and
movement between states of said first state machine is at least partly controlled by a current state of said second state machine such that if said second communication circuit changes to a state in which communication is in error part way through a pending communication transaction between said first communication circuit and said second communication circuit, then said first state machine makes an associated move between states and said first communication circuit processes said pending communication transaction in accordance with a modified behaviour.

2. An integrated circuit as claimed in claim 1, wherein movement between states of said second state machine is at least partly controlled by a current state of said first state machine such that if said first communication circuit changes to a state in which said first communication circuit does not communicate part way through a pending communication transaction between said first communication circuit and said second communication circuit, then said second state machine makes an associated move between states and said second communication circuit continues processing of said pending communication transaction in accordance with a modified behaviour.

3. An integrated circuit as claimed in claim 1, wherein said first domain and said second domain are separately controllable in respect of at least one of:
being independently resetable;
being independently selectively powered down; and
being independently clocked.

4. An integrated circuit as claimed in claim 1, wherein said modified behaviour comprises one of:
returning a transaction error response;
returning no response; and
returning a predetermined default response.

5. An integrated circuit as claimed in claim 1, wherein said first communication circuit and said second communication circuit are respective ones of a transaction master circuit and a transaction slave circuit with respect to passing said pending communication transaction.

6. An integrated circuit as claimed in claim 5, wherein said first communication circuit is a transaction master circuit and said first state machine moves to a holding state in response to said second state machine moving to a state indicative of either said second communication circuit processing said pending communication transaction or not communicating and moves from said holding state in response to said second state machine moving to a state indicative of either said second communication circuit being ready to receive a further communication transaction or not communicating.

7. An integrated circuit as claimed in claim 6, wherein said first state machine moves from a ready state to a busy state when said second communication circuit is in a ready state and a communication transaction is initiated.

8. An integrated circuit as claimed in claim 5, wherein said second communication circuit is a transaction slave circuit and said second state machine moves from a ready state to a busy state when said first state machine moves to a busy state.

9. An integrated circuit as claimed in claim 6, wherein said second state machine moves from a busy state to a ready state when said first state machine is in said holding state or is not communicating and processing of said pending transaction has been completed by said second communication circuit.

10. An integrated circuit as claimed in claim 1, wherein said first state machine and said second state machine communicate their respective states via one hot encoding signals with signals not conforming to one hot encoding being ignored.

11. An integrated circuit as claimed in claim 1, wherein one of said first domain and said second domain comprises a debug circuit domain.

12. An integrated circuit as claimed in claim 1, wherein said first state machine is part of a first communication state machine controlling communication by said first communication circuit and said second state machine is part of a second communication state machine controlling communication by said second communication circuit.

13. An integrated circuit as claimed in claim 1, wherein said first domain and said second domain are separately controllable in respect of at least recovery from an error condition.

14. An integrated circuit as claimed in claim 13, wherein said error condition is one of:
an error resulting from processing based upon a signal value sampled before reaching a correct value with said recovery being restoring a preceding error-free state;
a soft error with said recovery being restoring a preceding state; and
a permanent error with said recovery being switching to use of alternative circuits.

15. An integrated circuit as claimed in claim 1, wherein said modified behaviour comprises stalling processing of said pending communication transaction by said first communication circuit at part way through said pending communication transaction and when said second communication circuit is able to communicate, completing said pending communication transaction starting from a point dependent upon said stalling point.

16. An integrated circuit as claimed in claim 1, wherein said modified behaviour comprises stopping processing of said pending communication transaction by said first communication circuit at a termination point part way through said pending communication transaction and when said second communication circuit is able to communicate, initiating a further communication transaction corresponding to that portion of said pending communication transaction following said termination point.

17. An integrated circuit as claimed in claim 16, wherein said first communication circuit and said second communication circuit are respective ones of a transaction slave circuit and a transaction master circuit with respect to passing said pending communication transaction with said first communication circuit and said second communication circuit changing roles to be respective ones of said transaction master circuit and said transaction slave circuit with respect to passing said further communication transaction.

18. An integrated circuit as claimed in claim 13, wherein:
in response to said second state machine moving to a state indicative of being unable to communicate when part way through said pending communication, said first communication circuit moves to a recovery state; and
in response to said second state machine moving to a state indicative of said second communication circuit completing recovery from said error and being ready to communicate, said first communication circuit moves from said recovery state to complete said pending communication transaction.

19. An integrated circuit comprising:
a first domain including a first communication means;
a second domain including a second communication means coupled to said first communication means;
a first state machine means for moving between states indicative of a communication status of said first communication means; and
a second state machine means for moving between states indicative of a communication status of said second communication means; wherein
said first domain and said second domain are separately controllable such that at least said second communication means may independently move to a state in which said second communication means does not communicate with at least said first communication means; and
movement between states of said first state machine means is at least partly controlled by a current state of said second state machine means such that if said second communication means changes to a state in which communication is in error part way through a pending communication transaction between said first communication means and said second communication means, then said first state machine means makes an associated move between states and said first communication means processes said pending communication transaction in accordance with a modified behaviour.

20. A method of operating an integrated circuit having a first domain including a first communication circuit and a second domain including a second communication circuit coupled to said first communication circuit, said method comprising the steps of:
communicating between said first communication circuit and said second communication circuit with communication transactions;
moving a first state machine between states indicative of a communication status of said first communication circuit; and
moving a second state machine between states indicative of a communication status of said second communication circuit; wherein
said first domain and said second domain are separately controllable such that at least said second communication circuit may independently move to a state in which said second communication circuit does not communicate with at least said first communication circuit; and
movement between states of said first state machine is at least partly controlled by a current state of said second state machine such that if said second communication circuit changes to a state in which communication is in error part way through a pending communication transaction between said first communication circuit and said second communication circuit, then said first state machine makes an associated move between states and said first communication circuit processes said pending communication transaction in accordance with a modified behaviour.

21. A method as claimed in claim 20, wherein movement between states of said second state machine is at least partly controlled by a current state of said first state machine such that if said first communication circuit changes to a state in which said first communication circuit does not communicate part way through a pending communication transaction between said first communication circuit and said second communication circuit, then said second state machine makes an associated move between states and said second communication circuit continues processing of said pending communication transaction in accordance with a modified behaviour.

22. A method as claimed in claim 20, wherein said first domain and said second domain are separately controllable in respect of at least one of:
being independently resetable;
being independently selectively powered down; and
being independently clocked.

23. A method as claimed in claim 20, wherein said modified behaviour comprises one of:
returning a transaction error response;
returning no response; and
returning a predetermined default response.

24. A method as claimed in claim 20, wherein said first communication circuit and said second communication circuit are respective ones of a transaction master circuit and a transaction slave circuit with respect to passing said pending communication transaction.

25. A method as claimed in claim 24, wherein said first communication circuit is a transaction master circuit and said first state machine moves to a holding state in response to said second state machine moving to a state indicative of either said second communication circuit processing said pending communication transaction or not communicating and moves from said holding state in response to said second state machine moving to a state indicative of either said second communication circuit being ready to receive a further communication transaction or not communicating.

26. A method as claimed in claim 25, wherein said first state machine moves from a ready state to a busy state when said second communication circuit is in a ready state and a communication transaction is initiated.

27. A method as claimed in claim 24, wherein said second communication circuit is a transaction slave circuit and said second state machine moves from a ready state to a busy state when said first state machine moves to a busy state.

28. A method as claimed in claim 25, wherein said second state machine moves from a busy state to a ready state when said first state machine is in said holding state or is not communicating and processing of said pending transaction has been completed by said second communication circuit.

29. A method as claimed in claim 20, wherein said first state machine and said second state machine communicate their respective states via one hot encoding signals with signals not conforming to one hot encoding being ignored.

30. A method as claimed in claim 20, wherein one of said first domain and said second domain comprises a debug circuit domain.

31. A method as claimed in claim 20, wherein said first state machine is part of a first communication state machine controlling communication by said first communication circuit and said second state machine is part of a second communication state machine controlling communication by said second communication circuit.

32. A method as claimed in claim 20, wherein said first domain and said second domain are separately controllable in respect of at least recovery from an error condition.

33. A method as claimed in claim 32, wherein said error condition is one of:
an error resulting from processing based upon a signal value sampled before reaching a correct value with said recovery being restoring a preceding error-free state;
a soft error with said recovery being restoring a preceding state; and
a permanent error with said recovery being switching to use of alternative circuits.

34. A method as claimed in claim 32, wherein:
in response to said second state machine moving to a state indicative of being unable to communicate when part way through said pending communication, said first communication circuit moves to a recovery state; and
in response to said second state machine moving to a state indicative of said second communication circuit completing recovery from said error and being ready to communicate, said first communication circuit moves from said recovery state to complete said pending communication transaction.

35. A method as claimed in claim 20, wherein said modified behaviour comprises stalling processing of said pending communication transaction by said first communication circuit at part way through said pending communication transaction and when said second communication circuit is able to communicate, completing said pending communication transaction starting from a point dependent upon said stalling point.

36. A method as claimed in claim 20, wherein said modified behaviour comprises stopping processing of said pending communication transaction by said first communication circuit at a termination point part way through said pending communication transaction and when said second communication circuit is able to communicate, initiating a further communication transaction corresponding to that portion of said pending communication transaction following said termination point.

37. A method as claimed in claim 36, wherein said first communication circuit and said second communication circuit are respective ones of a transaction slave circuit and a transaction master circuit with respect to passing said pending communication transaction with said first communication circuit and said second communication circuit changing roles to be respective ones of said transaction master circuit and said transaction slave circuit with respect to passing said further communication transaction.

* * * * *